D. SMITH.
NUT LOCK.
APPLICATION FILED AUG. 2, 1910.

981,321.

Patented Jan. 10, 1911.

Inventor
Drew Smith.

Witnesses

By *Attorneys*

UNITED STATES PATENT OFFICE.

DREW SMITH, OF KELLERMAN, ALABAMA.

NUT-LOCK.

981,321.

Specification of Letters Patent. Patented Jan. 10, 1911.

Application filed August 2, 1910. Serial No. 575,177.

*To all whom it may concern:*

Be it known that I, DREW SMITH, a citizen of the United States, residing at Kellerman, in the county of Tuscaloosa and State of Alabama, have invented certain new and useful Improvements in Nut-Locks, of which the following is a specification.

This invention relates to nut locks, and refers particularly to a device adaptable for rail joints.

An object of the invention is to provide a nut lock which necessitates but a slight change in the form of the usual bolt and nut now employed, and in providing a key of simple construction for coöperation with the bolt and nut to lock the same from movement relative to one another when in position.

The invention contemplates a simple form of nut lock which does not require attention when once in place, which can be easily and quickly locked and released, and one which can be economically manufactured.

For a full understanding of the invention reference is to be had to the following description and accompanying drawing, in which:—

Figure 1:
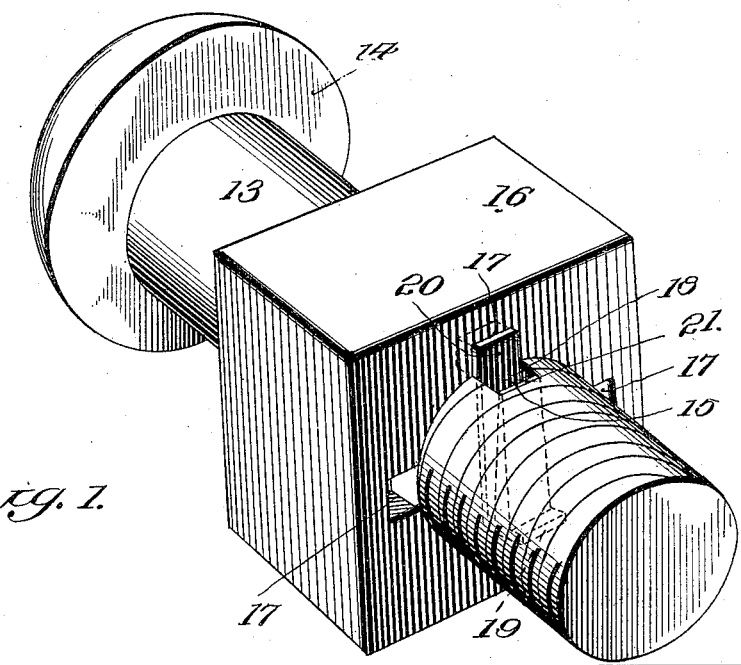
Figure 3:
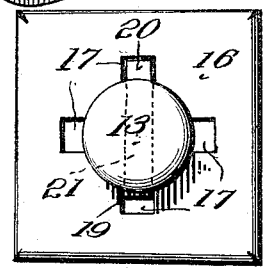
Figure 2:
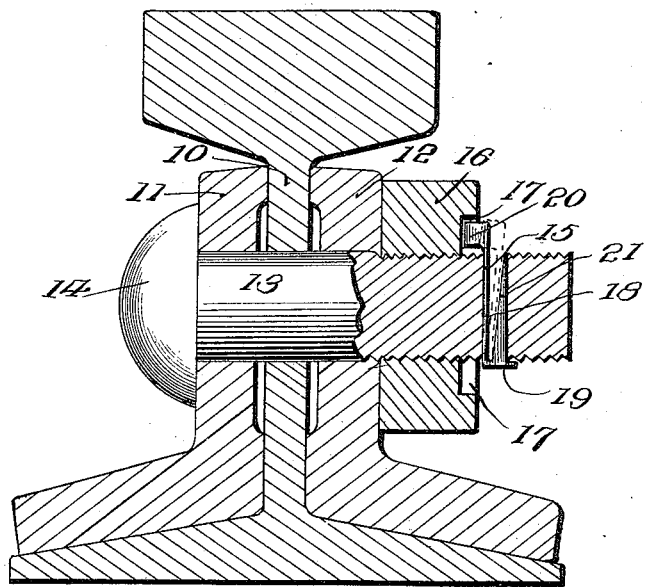
Figure 4:
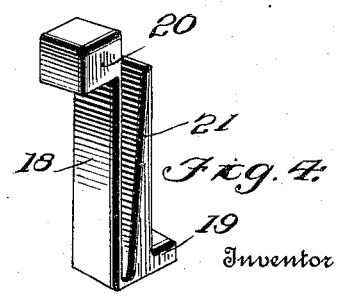

Figure 1 is a perspective view of the improved bolt and nut in a locked position. Fig. 2 is a longitudinal section through the same as applied to a rail joint. Fig. 3 is an outer end view of the bolt and nut lock. Fig. 4 is a detail perspective view of the improved key.

Corresponding and like parts are referred to in the following description and indicated in all the views of the accompanying drawing by the same reference characters.

Referring to the drawing the numeral 10 designates the web of a rail which is provided against its opposite faces with the fish-plates 11 and 12.

The improved nut lock comprises a bolt 13 threaded at its outer end and provided with a head 14. The head 14 is disclosed as resting against the fish-plate 11, while the bolt 13 extends through the fish-plates 11 and 12 and the web 10 of the rail, the threaded extremity of the bolt projecting beyond the fish-plate 12. The bolt 13 is provided with a transverse opening or channel 15 which is diametrically disposed therethrough at a point spaced inwardly from the threaded extremity of the bolt. A nut 16 engages in threaded relation over the bolt 13 and is provided in its outer face with a plurality of depressions 17. As disclosed in the drawings the depressions 17 are preferably four in number, which are arranged in opposite relation to one another. The depressions 17 in the nut 16 are adapted for registration with the channel 15 when the nut 16 is tightened against the fish-plate 12.

The locking member employed comprises a key 18 formed of a flattened portion of metal engaging through the channel 15. One end of the key is turned outwardly at substantially right angles to the key to form a stop 19 resting against the side of the bolt 13. The opposite extremity of the key 18 is provided with a block 20 serving as a locking medium and adapted for engagement in the depressions 17. The transverse channel 15 is preferably of rectangular form and the key 18 is relatively thin so as to rest against the inner wall of the channel 15. The stop 19 carries a tapering spring arm 21 extending into and through the channel 15. The arm 21 engages against the outer wall of the channel 15 and holds the key 18 against the opposite wall to secure the block 20 within the depression 17.

In positioning the improved nut lock upon a rail joint, the threaded bolt 13 is first passed through the fish-plates 11 and 12 and the rear web 10. The nut 16 is fed over the threaded end of the bolt 13 and tightened against the fish-plate 12. The nut 16 is rotated sufficiently to register one of the depressions 17 with one end of the channel 15. The key is now positioned by inserting the block 20 in one end of the channel 15 and depressing the spring arm 21 toward the key 18. When the stop 19 strikes against the side of the bolt 13, the block 20 is freed from the channel 15 and, under the action of the spring arm 21 falls into the adjacent depression 17. The rotation of the nut 16 is thus arrested from movement in either direction.

It is of course understood that the improved nut and bolt lock may be applied to the end of a rod or a bolt of practically any form other than that disclosed in the accompanying drawing, so that the improved nut and bolt lock is applicable to other devices than rail joints.

Having thus described the invention what is claimed as new is:—

1. A nut-lock including a threaded bolt having a diametrically formed channel therein, a nut engaging over the bolt and having spaced depressions arranged diametrically opposite and communicating with the central opening through the nut for registration with the channel in the bolt, and a key engaging in the channel and having an inwardly extending block seating in the depressions of the nut at one end, and a stop formed upon the opposite end to limit the movement of the key through the channel.

2. A nut-lock including a threaded bolt having a diametrically formed channel therein, a nut engaging over the bolt having a centrally threaded aperture and oppositely registering depressions in its outer face communicating with the aperture, a key engaging through the channel in the bolt having a stop upon one end to limit the movement of the key in the channel, and a block upon its opposite end seating in the registering depression of the nut, said key also having a diverging spring-arm upon one end for engagement against the outer wall of the channel to seat the block within the depression.

In testimony whereof, I affix my signature in presence of witnesses.

DREW $\overset{\text{his}}{\times}$ SMITH. [L. S.]
mark

Witnesses:
 E. J. CRANDALL,
 C. E. CRANDALL,
 J. W. GRAY.